United States Patent
Maling, III et al.

(10) Patent No.: US 9,823,892 B2
(45) Date of Patent: Nov. 21, 2017

(54) AUDIO ADJUSTMENT SYSTEM

(75) Inventors: Robert C. Maling, III, Huntington Beach, CA (US); James Tracey, Laguna Niguel, CA (US); Daekyoung Noh, Newport Beach, CA (US)

(73) Assignee: DTS LLC, Calabasas, CA (US)

( * ) Notice: Subject to any disclaimer, the term of this patent is extended or adjusted under 35 U.S.C. 154(b) by 346 days.

(21) Appl. No.: 13/592,182

(22) Filed: Aug. 22, 2012
(Under 37 CFR 1.47)

(65) Prior Publication Data
US 2013/0097510 A1 Apr. 18, 2013

Related U.S. Application Data

(60) Provisional application No. 61/528,094, filed on Aug. 26, 2011.

(51) Int. Cl.
*G06F 3/16* (2006.01)
*H04L 12/28* (2006.01)
(Continued)

(52) U.S. Cl.
CPC ............ *G06F 3/165* (2013.01); *G10L 19/008* (2013.01); *H04L 12/282* (2013.01); *H04N 21/4852* (2013.01); *H04R 3/04* (2013.01); *H04L 2012/2849* (2013.01); *H04N 5/602* (2013.01); *H04R 5/04* (2013.01); *H04R 27/00* (2013.01); *H04R 29/008* (2013.01);
(Continued)

(58) Field of Classification Search
CPC ............ G06F 3/16; G06F 3/167; G06F 3/165
USPC ........................................ 715/727
See application file for complete search history.

(56) References Cited

U.S. PATENT DOCUMENTS 5,406,634 A    4/1995   Anderson et al.
5,450,490 A *   9/1995   Jensen ................... H04H 20/31
                                                     380/241
(Continued)

FOREIGN PATENT DOCUMENTS

DE         3331352       3/1985
EP          0 097 982      1/1984
(Continued)

OTHER PUBLICATIONS

Onkyo, "AV Receiver HT-RC260 Instruction Manual", 2010, Onkyo Corporation, pp. 1-72.*
(Continued)

*Primary Examiner* — Nicholas Klicos
(74) *Attorney, Agent, or Firm* — Knobbe, Martens, Olson & Bear, LLP

(57) ABSTRACT

An audio adjustment system is provided that can output a user interface customized by the provider of the audio system instead of the electronic device manufacturer. Such an arrangement can save both field engineers and manufacturers a significant amount of time. Advantageously, in certain embodiments, such an audio adjustment system can be provided without knowledge of the electronic device's firmware. Instead, the audio adjustment system can communicate with the electronic device through an existing audio interface in the electronic device to enable a user to control audio enhancement parameters in the electronic device. For instance, the audio adjustment system can control the electronic device via an audio input jack on the electronic device.

24 Claims, 11 Drawing Sheets

(51) Int. Cl.
*H04R 3/04* (2006.01)
*G10L 19/008* (2013.01)
*H04N 21/485* (2011.01)
*H04N 5/60* (2006.01)
*H04R 5/04* (2006.01)
*H04R 27/00* (2006.01)
*H04R 29/00* (2006.01)

(52) U.S. Cl.
CPC .. *H04R 2227/003* (2013.01); *H04R 2227/005* (2013.01); *H04R 2420/09* (2013.01); *H04R 2430/01* (2013.01); *H04R 2499/13* (2013.01); *H04R 2499/15* (2013.01)

(56) References Cited

U.S. PATENT DOCUMENTS

| | | | | |
|---|---|---|---|---|
| 5,581,621 | A * | 12/1996 | Koyama | H04S 7/301 381/103 |
| 5,870,480 | A | 2/1999 | Griesinger | |
| 6,223,162 | B1 * | 4/2001 | Chen | H03M 7/46 704/501 |
| 6,430,301 | B1 | 8/2002 | Petrovic | |
| 6,442,517 | B1 * | 8/2002 | Miller | G10L 19/167 370/493 |
| 6,512,796 | B1 * | 1/2003 | Sherwood | G10L 19/018 375/242 |
| 6,614,914 | B1 | 9/2003 | Rhoads et al. | |
| 6,624,873 | B1 | 9/2003 | Callahan, Jr. et al. | |
| 6,737,957 | B1 | 5/2004 | Petrovic et al. | |
| 6,760,448 | B1 | 7/2004 | Gundry | |
| 6,850,252 | B1 * | 2/2005 | Hoffberg | 715/716 |
| 6,972,363 | B2 * | 12/2005 | Georges et al. | 84/609 |
| 7,212,872 | B1 | 5/2007 | Smith et al. | |
| 7,391,409 | B2 * | 6/2008 | Zalewski et al. | 345/156 |
| 7,395,211 | B2 | 7/2008 | Watson et al. | |
| 7,451,093 | B2 | 11/2008 | Kraemer | |
| 7,502,759 | B2 | 3/2009 | Hannigan et al. | |
| 7,593,781 | B1 * | 9/2009 | Rhea | G06F 3/162 381/58 |
| 7,801,734 | B2 | 9/2010 | Kraemer | |
| 8,156,433 | B2 * | 4/2012 | Pietrusko et al. | 715/700 |
| 2001/0020193 | A1 | 9/2001 | Teramachi et al. | |
| 2002/0002039 | A1 * | 1/2002 | Qureshey | G06F 17/30749 455/344 |
| 2002/0053275 | A1 | 5/2002 | Ogawa et al. | |
| 2002/0097337 | A1 * | 7/2002 | Bin Adan | H04N 17/04 348/553 |
| 2002/0129151 | A1 | 9/2002 | Yuen et al. | |
| 2002/0157005 | A1 | 10/2002 | Brunk et al. | |
| 2003/0167165 | A1 * | 9/2003 | Schroder et al. | 704/212 |
| 2003/0185418 | A1 | 10/2003 | Linnartz et al. | |
| 2004/0010670 | A1 * | 1/2004 | Pelly | 711/164 |
| 2004/0169581 | A1 | 9/2004 | Petrovic et al. | |
| 2004/0234088 | A1 | 11/2004 | McCarty et al. | |
| 2005/0078851 | A1 | 4/2005 | Jones et al. | |
| 2005/0240415 | A1 * | 10/2005 | Wiese | H04B 1/665 704/500 |
| 2005/0276426 | A1 * | 12/2005 | Ono et al. | 381/104 |
| 2006/0047523 | A1 * | 3/2006 | Ojanpera | G10L 19/0208 704/503 |
| 2006/0142069 | A1 * | 6/2006 | Choi | H04M 1/6058 455/569.1 |
| 2006/0205362 | A1 * | 9/2006 | Chang | H04B 1/1646 455/79 |
| 2006/0229108 | A1 * | 10/2006 | Cehelnik | H04M 1/72522 455/569.1 |
| 2007/0025842 | A1 | 2/2007 | Bouru | |
| 2007/0061026 | A1 * | 3/2007 | Wang | H04R 25/407 700/94 |
| 2007/0105599 | A1 * | 5/2007 | Hsu | H04M 1/04 455/573 |
| 2007/0155313 | A1 * | 7/2007 | Goldberg et al. | 455/3.06 |
| 2008/0208403 | A1 * | 8/2008 | Bertosa | G07C 5/0808 701/31.4 |
| 2008/0227390 | A1 * | 9/2008 | Dinn | H04B 5/00 455/41.1 |
| 2008/0279390 | A1 * | 11/2008 | Woolfork | H04R 1/1083 381/74 |
| 2009/0097588 | A1 * | 4/2009 | El-Agha et al. | 375/295 |
| 2009/0268922 | A1 * | 10/2009 | Yamashita | H04B 3/54 381/77 |
| 2010/0020988 | A1 * | 1/2010 | McLeod | H03G 5/025 381/107 |
| 2010/0054493 | A1 * | 3/2010 | Lin | H01H 9/0228 381/74 |
| 2010/0248687 | A1 * | 9/2010 | Barsoum et al. | 455/410 |
| 2010/0275092 | A1 * | 10/2010 | Ogiso | 714/752 |
| 2010/0305732 | A1 * | 12/2010 | Serletic | 700/94 |
| 2011/0207443 | A1 * | 8/2011 | Potter et al. | 455/414.1 |
| 2011/0234916 | A1 * | 9/2011 | Fujita et al. | 348/738 |
| 2011/0238426 | A1 * | 9/2011 | Fuchs et al. | 704/500 |
| 2011/0293100 | A1 * | 12/2011 | Stultz et al. | 381/28 |
| 2011/0299697 | A1 * | 12/2011 | Sawai | H04B 1/3805 381/79 |
| 2012/0005665 | A1 * | 1/2012 | Repellin | G06F 8/65 717/168 |
| 2012/0019309 | A1 * | 1/2012 | Turner | H03K 5/1254 327/524 |
| 2012/0023406 | A1 * | 1/2012 | Fujita et al. | 715/727 |
| 2012/0039481 | A1 * | 2/2012 | Mcclain | H04R 1/1066 381/74 |
| 2012/0136612 | A1 * | 5/2012 | Vanderhoff et al. | 702/119 |
| 2012/0159534 | A1 * | 6/2012 | Quan et al. | 725/31 |
| 2012/0283860 | A1 * | 11/2012 | Ho et al. | 700/94 |

FOREIGN PATENT DOCUMENTS

| | | |
|---|---|---|
| EP | 0 320 270 | 6/1989 |
| EP | 0 354 517 | 2/1990 |
| EP | 0 357 402 | 3/1990 |
| EP | 0 367 569 | 5/1990 |
| EP | 0 526 880 | 2/1993 |
| EP | 0 637 191 | 2/1995 |
| EP | 0 699 012 | 2/1996 |
| EP | 0 756 437 | 1/1997 |
| GB | 2154835 | 9/1985 |
| GB | 2277855 | 11/1994 |
| JP | 58-144989 | 8/1983 |
| JP | 58-146200 | 8/1983 |
| JP | 05-300596 | 11/1993 |
| JP | 06-133600 | 5/1994 |
| JP | 09-224300 | 8/1997 |
| JP | 2004-165692 | 6/2004 |
| WO | WO 87/06090 | 10/1987 |
| WO | WO 91/19407 | 12/1991 |
| WO | WO 94/16548 | 8/1994 |
| WO | WO 96/34509 | 10/1996 |
| WO | WO 98/20709 | 5/1998 |
| WO | WO 01/61987 | 8/2001 |

OTHER PUBLICATIONS

International Search Report and Written Opinion issued in application No. PCT/US2012/051917, dated Mar. 1, 2013.
Written Opinion issued in application No. PCT/US2012/051917, dated Aug. 6, 2013.
Boney L. et al., "Digital Watermarks for Audio Signals", Proceedings of the International Conference on Multimedia Computing and Systems, Los Alamitos, CA, US; Jun. 17, 1996, pp. 473-480.
International Preliminary Report on Patentability issued in application No. PCT/US2005/015291 dated Nov. 9, 2006.
International Search Report and Written Opinion issued in application No. PCT/US2005/015291 dated Aug. 2, 2005.
Huyett, "An AFSK Interface for Android™ Smartphones—Use Your Phone as a Digital Communications Terminal.", ARRL, pp. 30-32, May 2012.
Davies et al., RaneNote, Squeeze Me, Stretch Me: The DC 24 Users Guide, pp. 1-6, 1993.

(56) References Cited

OTHER PUBLICATIONS

Search Report issued in application No. 101130818 dated Feb. 25, 2016.

* cited by examiner

US 9,823,892 B2

AUDIO ADJUSTMENT SYSTEM

RELATED APPLICATIONS

This application claims the benefit of priority under 35 U.S.C. §119(e) of U.S. Provisional Application No. 61/528,094, filed on Aug. 26, 2011, and entitled "Audio Adjustment System," the disclosure of which is hereby incorporated by reference in its entirety.

BACKGROUND

Televisions and other consumer devices that incorporate audio enhancement systems can be tuned to improve the performance of the audio enhancement systems. Tuning is often performed by field application engineers (FAE), who may adjust various parameters of the audio enhancement system. In order to interact with the audio system installed on a device, an FAE's device (such as a laptop) typically must communicate with other device-specific firmware in the television. The FAE's device may communicate with the device-specific firmware using one of a variety of protocols, such as JTAG, I2C, SPI, or USB.

The consumer device manufacturer typically provides a user interface that allows the FAE to communicate audio parameter adjustments to the device-specific firmware. The device-specific firmware then communicates the parameter adjustments to the firmware of the audio system.

SUMMARY

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

In certain embodiments, a method of communicating audio enhancement settings to an audio device includes, by a first device comprising one or more processors: outputting an adjustment user interface for presentation to a user, where the adjustment user interface can provide functionality for a user to adjust audio enhancement parameters of one or more audio enhancements installed in a second device. The method can also include receiving, through the adjustment user interface, a selection from the user of an adjusted value of a selected one of the audio enhancement parameters. In addition, the method can include encoding the adjusted value of the selected audio enhancement parameter in an audio signal and communicating the audio signal to the second device, thereby enabling the second device to set the selected audio enhancement parameter to the adjusted value.

The method of the preceding paragraph may also be performed in combination with any subset of the following features: communicating the audio signal to the second device includes communicating the audio signal through an audio output port of the first device to an audio input port of the second device; communicating the audio signal to the second device includes communicating the audio signal over a network to the second device; communicating the audio signal to the second device includes communicating the audio signal from a speaker of the first device to a microphone of the second device; encoding the adjusted value includes including a trigger signal in the audio signal, where the trigger signal can cause the second device to decode the audio signal; and where the encoding includes modulating the adjusted value with audio frequency shift keying (AFSK).

In various embodiments, a system for communicating audio enhancement settings to an audio device can include an adjustment module that can provide functionality for a user to adjust audio enhancement parameters of one or more audio enhancements installed in an audio device and to receive a selection from the user of an adjusted value of a selected one of the audio enhancement parameters. The system can also include a communications module having one or more processors. The communications module can encode the adjusted value of the selected audio enhancement parameter in an audio signal and communicate the audio signal to the audio device, thereby enabling the audio device to set the selected audio enhancement parameter to the adjusted value.

The system of the preceding paragraph may also include any subset of the following features: the adjustment module can also provide functionality for the user to access values of the audio enhancement parameters currently set in the audio device; the communications module can output the audio signal via one or more of the following: an audio output port, a speaker, and a network connection; the output port can be selected from the group consisting of: a speaker jack, an RCA audio interface, an HDMI interface, a DVI interface, a coaxial cable interface, a USB interface, and a SCART interface; the communications module can encode the adjusted value using an error correction coder; the adjusted value can include one or more of the following: a gain value, a filter coefficient, a parametric equalization coefficient, an equalizer band level, a left-right channel balance, a surround sound balance, a decoder setting, an encoder setting, and a speaker-specific setting; the communications module can encode the adjusted value with a trigger signal in the audio signal, where the trigger signal can cause the audio device to decode the audio signal; and the trigger signal can represent a passcode.

In some embodiments, non-transitory physical electronic storage includes instructions stored thereon that, when executed by one or more processors, cause the one or more processors to implement a system for communicating audio enhancement settings to an audio device. The system can include an adjustment module in a first device including one or more processors, and the adjustment module can specify an adjustment for an audio enhancement installed in a second device in communication with the first device. The system can also include a communications module in the first device, which can encode the adjustment in an audio signal and communicate the audio signal to the second device, thereby enabling the second device to implement the adjustment. The communication of the audio signal to the second device can include communicating the audio signal through an audio output port of the first device to an audio input port of the second device.

The system of the preceding paragraph may also include any subset of the following features: the adjustment module can output a user interface that can provide functionality for the user to input the adjustment; the adjustment can include a value of a parameter of the audio enhancement; the adjustment can include an instruction to disable the audio enhancement; the first device can enhance an audio signal using a second audio enhancement to produce an enhanced audio signal and to provide the enhanced audio signal to the second device; the adjustment module can specify the adjustment to disable the audio enhancement installed in the second device due to the second audio enhancement already being applied to the audio signal; and the first device can be an audiovisual receiver and the second device can be a television.

Moreover, in certain embodiments, a system for communicating audio-visual settings to an electronic device includes an adjustment module that can provide functionality for a user to adjust one or both of audio parameters or video parameters in an electronic device and can receive a selection from the user of an adjusted value of a selected one of the audio or video parameters. The system can also include a communications module that includes one or more processors. The communications module can encode a command for adjusting the adjusted value of the selected audio or video parameter in an audio signal and can communicate the audio signal to the electronic device, thereby enabling the electronic device to set the selected audio or visual parameter to the adjusted value.

The system of the preceding paragraph may also include any subset of the following features: the communications module can provide a trigger signal in the audio signal; the trigger signal can enable detection of the command for adjusting the adjusted value in the audio signal; the trigger signal can enable communications synchronization in the electronic device; and a level of the trigger signal can be used to interpret amplitude of the audio signal.

Various embodiments of a system for decoding audio enhancement settings with an audio device include a detector implemented in an audio device including one or more processors. The detector can receive an audio signal and can analyze the audio signal to determine whether a trigger signal is present in the audio signal. The detector can cause the audio signal to be decoded in response to detecting the trigger signal in the audio signal. Further, the detector can pass the audio signal to an audio enhancement for audio processing in response to not detecting the trigger signal in the audio signal. The system can also include a decoder that can, in response to the trigger signal being detected by the detector, decode an instruction in the audio signal, and a configuration module that can implement the instruction to thereby adjust a characteristic of the audio enhancement.

The system of the preceding paragraph may also include any subset of the following features: the detector can receive the audio signal from one or more of the following: an audio input port in the audio device and a microphone in the audio device; the detector can receive the audio signal over a network; the audio signal can be formatted according to audio frequency shift keying (AFSK) modulation; the decoder can decode the audio signal by performing one or more of the following: demodulation, error correction, and data extraction; and the audio enhancement includes one or more of the following: a bass enhancement, a width enhancement, a height enhancement, a virtual surround enhancement, and an equalization enhancement.

In certain embodiments, a method of decoding audio enhancement settings with an audio device includes receiving, with a first device, an audio signal and analyzing the audio signal to determine whether the audio signal is associated with one or more commands or audio other than commands. The method may also include, in response to determining that the audio signal is associated with audio other than commands, providing the audio signal to an audio processing system that can process the audio signal. In response to determining that the audio signal is associated with one or more commands, the method may also include decoding the audio signal to identify the one or more commands in the audio signal. Further, the method can include executing the one or more commands in one or more processors of the first device.

The method of the preceding paragraph may also be performed in combination with any subset of the following features: the one or more commands can obtain information about the audio processing system for presentation to a second device; the one or more commands can adjust an enhancement parameter associated with an audio enhancement of the audio processing system; the enhancement parameter can include one of the following: a gain value, a filter coefficient, a parametric equalization coefficient, an equalizer band level, a left-right channel balance, a surround sound balance, a decoder setting, an encoder setting, and a speaker-specific setting; the method can further include muting an output of the first device in response to determining that the audio signal is associated with the one or more commands; the analyzing can include determining whether the audio signal includes a trigger signal; and determining whether the audio signal includes a trigger signal can include evaluating one or both of zero crossings and signal power of the audio signal to determine whether the audio signal comprises one or more expected cycles of one or more frequencies associated with the trigger signal.

In many embodiments, non-transitory physical electronic storage includes instructions stored thereon that, when executed by one or more processors, cause the one or more processors to implement a system for decoding audio enhancement settings with an audio device. The system can include a detector that can receive an audio signal and that can analyze the audio signal to determine whether an instruction is present in the audio signal. The detector can cause the instruction to be processed in response to determining that the instruction is present in the audio signal. The detector can also pass the audio signal to an audio enhancement for audio processing in response to determining that audio other than the instruction is present in the audio signal. Further, the system can include a configuration module that can process the instruction to adjust a configuration of the audio enhancement in response to the detector determining that the instruction is present in the audio signal.

The system of the preceding paragraph may also include any subset of the following features: the detector can determine whether the instruction is present in the audio signal by detecting a trigger signal in the audio signal; the detector can cause the instruction to be processed by first passing the audio signal to a decoder configured to decode the audio signal to obtain the instruction; the decoder can perform one or more of the following: demodulation, error correction, and data extraction; the error correction can include Reed-Solomon error correction; an encoder that can output data regarding the configuration module to a separate device; and the instruction can be encoded in a watermark in the audio signal.

Furthermore, various embodiments of a system for decoding audio-visual settings with an electronic device can include a communications module implemented in an electronic device having one or more processors. The communications module can: receive an audio signal, determine whether the audio signal includes a command for adjusting an audio or visual parameter of the electronic device, in response to determining that the audio signal does not include a command for adjusting the audio or visual parameter of the electronic device, pass the audio signal to an audio system of the electronic device, and in response to determining that the audio signal does include the command, provide the command to an application configured to adjust the audio or visual parameter in the electronic device.

The system of the preceding paragraph may also include any subset of the following features: the application can be the audio system; the application can be a television application that can control operation of a television; an audio processing system that can receive a second command from the television application, where the second command can implement the command in the audio processing system; and the communications module can also determine whether the audio signal includes the command by detecting determining whether the audio signal comprises a trigger signal.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Because the manufacturer provides the interface to the television for the FAE, the manufacturer typically must program its firmware and user interface to be compatible with the audio system. A problem that results from this arrangement is that these user interfaces are often hard to use or may not work properly with the audio system. For example, some field adjustment user interfaces for televisions require FAEs to input audio filter coefficients one at a time. An audio system may have several different filters, each with several coefficients to be adjusted. A mistake in one coefficient can result in the FAE having to re-enter all the coefficients (which may each have several digits) just to change the mistaken coefficient, due to the inefficiency of the user interface. As a result, FAE time is often wasted. Further, manufacturers must invest time in learning how to communicate with the audio system in order to design the user interface. The potential number of interface protocols and connectors (such as JTAG, I2C, SPI, and USB) that different devices can communicate with can also increase the complexity of the audio adjustment process for FAEs.

To address these and other issues, an audio adjustment system is provided that can output a user interface customized by the provider of the audio system instead of the electronic device manufacturer. Such an arrangement can save both field engineers and manufacturers a significant amount of time. Advantageously, in certain embodiments, such an audio adjustment system can be provided without knowledge of the electronic device's firmware. Instead, the audio adjustment system can communicate with the electronic device through an existing audio interface in the electronic device to enable a user to control audio enhancement parameters in the electronic device. For instance, the audio adjustment system can control the electronic device via an audio input jack on the electronic device.

II. Audio Adjustment System Overview

Figure 1A:
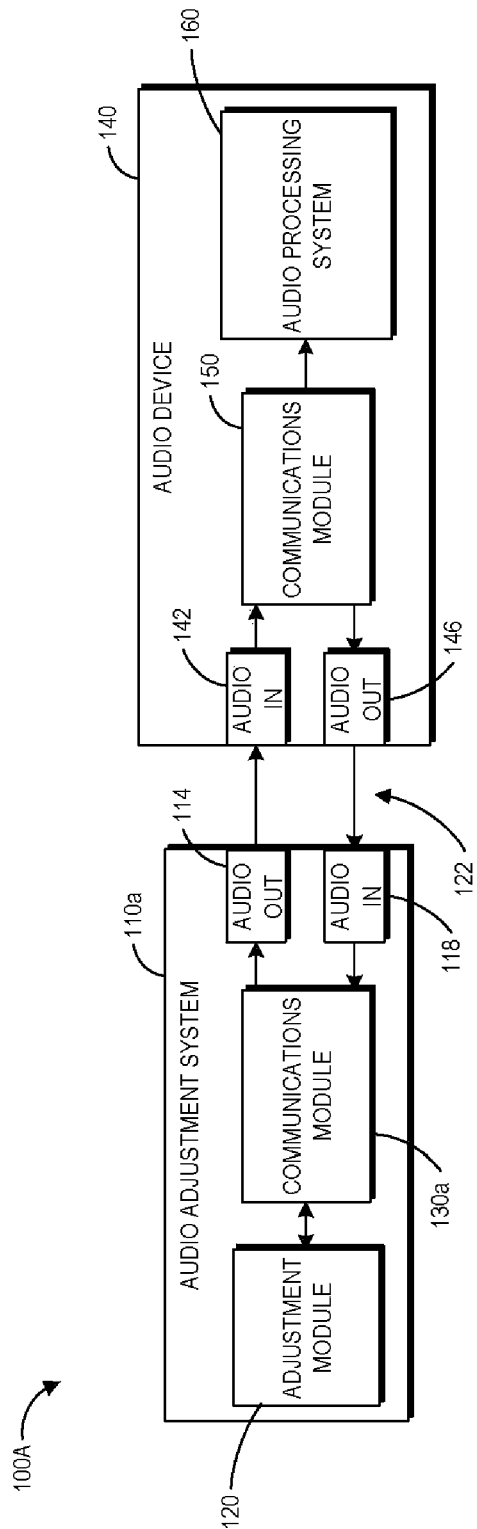
FIGS. 1A and 1B illustrate audio adjustment environments.
Figure 1B:
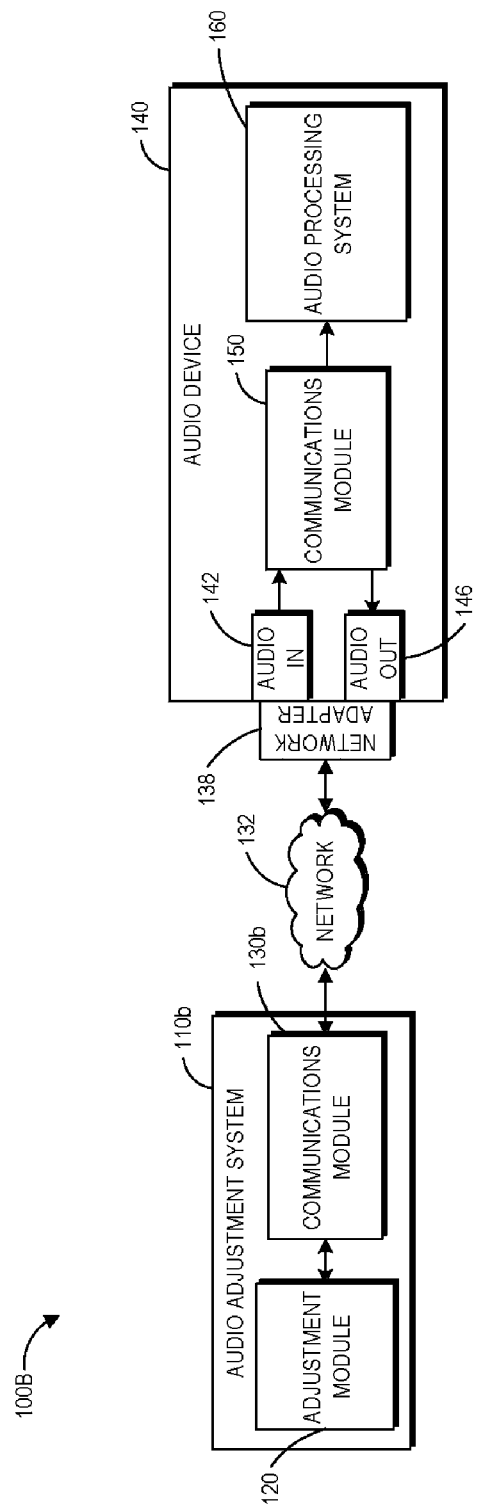

Turning to the FIGURES, FIGS. 1A and 1B illustrate audio adjustment environments 100A, 100B that each can implement an audio adjustment system 110a, 110b, respectively. In each audio adjustment environment 100, the audio adjustment system 110 communicates with an audio device 140. The audio adjustment system 110a of FIG. 1A communicates with the audio device 140 through audio input cables or the like, while the audio adjustment system 110b of FIG. 1B communicates with the audio device 140 over a network 132.

Referring specifically to FIG. 1A, the audio adjustment system 110a can communicate with any audio device 140 that includes one or more audio jacks or audio connectors. Some of the many examples of such devices 140 include televisions, computers (including desktops, laptops, tablets, and the like), wireless handheld devices (such as cell phones, smartphones, MP3 players, etc.), audiovisual receivers (AVR), soundbars, and vehicle audio systems. For ease of illustration, many examples in this specification will be described with respect to televisions. However, the features described herein may be applied to any electronic device capable of processing and/or outputting audio.

In the depicted embodiment, the audio adjustment system 110a includes an adjustment module 120, a communications module 130a, an audio output jack 114, and an audio input jack 118. The audio device 140 also includes audio input and output jacks 142, 146, a communications module 150, and an audio processing system 160. Cabling 122 (including one or more cables) connects the audio adjustment system 110a with the audio device 140 via the jacks 114, 142, 118, 146. The audio adjustment system 110a can communicate with the audio device 140 through any type of audio jack or connector, and any type of associated cabling. For example, the audio jacks 114, 118, 142, 146 can be any combination of a microphone jack (e.g., a TRS jack), an RCA audio connector interface, an HDMI interface, a DVI interface, a coaxial cable interface, a USB interface, or a SCART interface, to name a few examples. Although not shown, both the audio adjustment system 110a and the audio device 160 may include more or fewer components. For example, if the audio device 140 were a television, the audio device 140 could include video processing components, among other features. For ease of illustration, only the audio-related components are shown.

By way of overview, the adjustment module 120 provides functionality for a user (such as an FAE) to specify configuration changes to be made to audio enhancements implemented by the audio processing system 160 in the audio device 140. The adjustment module 120 provides user configuration changes to the communications module 130a, which sends an audio communications signal with the configuration changes to the communications module 150 in the audio device 140 via jacks 114, 142. The communications module 150 in the audio device 140 can extract the configuration change from the audio communications signal and provide the configuration changes to the audio processing system 160. The audio processing system 160 can implement the configuration changes to adjust one or more audio enhancements of the audio processing system 160. The communications module 130a can also obtain information from the audio processing system 160, such as information on existing audio enhancement settings, via the communications module 150 and jacks 118, 146.

The adjustment module 120 can be designed by the provider of the audio processing system 160. As this provider may have a better understanding of how the audio processing system 160 works and the most effective ways to tune it, the adjustment module 120 can have more functionality and better ease-of-use than existing user interfaces provided by manufacturers. Likewise, the communications module 150 can be designed by the provider of the audio processing system 160, enabling the provider of the audio processing system 160 to have greater control over adjustment of the audio processing system 160. In one scenario, a manufacturer of the audio device 140 enables the provider of the audio processing system 160 to store the communications module 150 together with the audio processing system 160 in an audio processing board in the audio device 140. As a result, the provider of the audio processing system 160 can advantageously communicate with the audio processing system 160 using the improved communication features described herein without having to modify the hardware or the non-audio firmware of the audio device 140. Further, the audio processing system 160 itself can also have additional features beyond audio enhancements, such as features for interpreting adjustment commands provided by the adjustment module 120.

Figure 2:
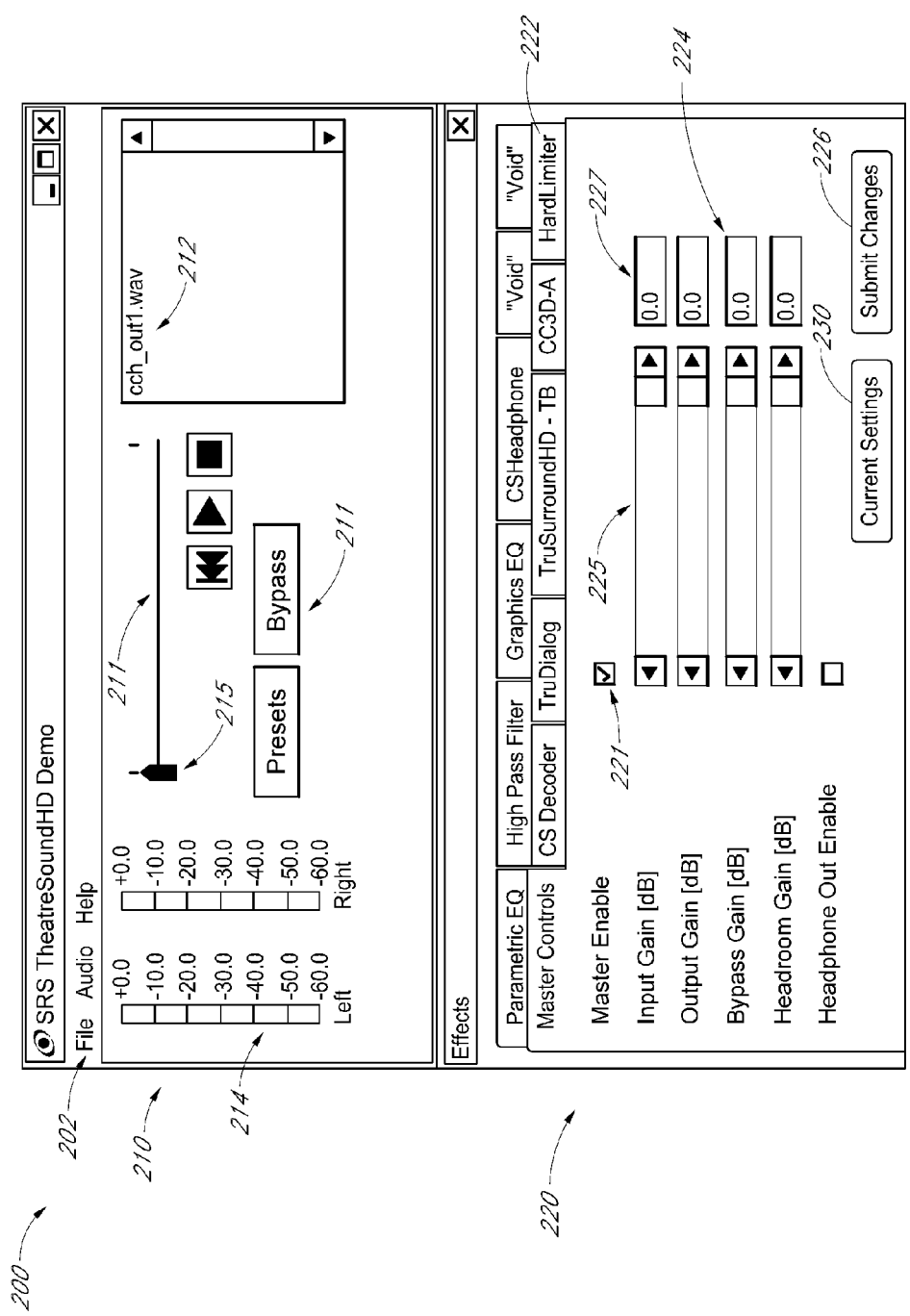
FIG. 2 illustrates an example audio adjustment user interface.

The adjustment module 120 of the audio adjustment system 110a can output a graphical user interface, a command-line interface, or a combination of both. An example user interface output by the adjustment module 120 is shown in FIG. 2 and described in detail below. The adjustment module 120 may permit adjustment of any of a variety of audio related parameters, including parameters specific to a particular audio enhancement installed in the audio device 140. Examples of audio enhancements include stereo enhancements, bass enhancements, multichannel audio (e.g., surround sound) enhancements, virtual speaker enhancements, enhanced audio decoders, 3D audio enhancements, and the like. Any parameter of these or other enhancements may be adjusted through the user interface provided by the adjustment module 120. The adjustment module 120 may also permit sound data to be uploaded to the audio device 140, retrieve data from the audio device 140 (such as information regarding current parameter values or settings of the audio processing system 160), and disable or enable enhancements in the audio processing system 160. More generally, the adjustment module 120 can enable a user to affect any operation of the audio processing system 160 in the audio device 140.

In response to receiving user input, the adjustment module 120 can provide one or more commands corresponding to the user input to the communications module 130a. The communications module 130a can encode the commands and communicate the commands to the audio device 140 through the audio output jack 114 and cabling 122. In certain embodiments, the communications module 130a implements a software or hardware modem for communicating with the audio device 140. The software or hardware modem of the communications module 130a can communicate with a corresponding software or hardware modem in the communications module 150 of the audio device 140 using any of a variety of communications technologies or protocols, detailed examples of which are provided below.

The communications module 150 in the audio device 140 can listen for communications from the communications module 130a in the audio adjustment system 110a. In one embodiment, if the communications module 150 in the audio device 140 detects a communications signal having a command on the audio input jack 142, the communications module 150 can pass the communications signal to the audio processing system 160 for adjustment or testing of the audio processing system 160. If the communications module 150 detects ordinary audio input from the audio input jack, the communications module 150 can pass the audio to the audio processing system 160 for enhancement processing.

In other embodiments, the audio signal input to the audio device 140 includes commands and ordinary audio together. For instance, the commands may be embedded in a digital watermark in the audio signal. In such instances, the communications module 150 can decode the commands while also passing the ordinary audio to the audio processing system 160. The ordinary audio may therefore play in parallel with or substantially in parallel with the processing of the commands. Thus, for example, while a television program is being output from a television (including audio), the audio adjustment system 110a in communication with the television may communicate with the audio processing system 160 to evaluate the performance or functionality of the audio processing system 160. The audio adjustment system 110a can also communicate with the audio device 140 while the device is processing audio without using watermarking in some embodiments. In the television example, the television can receive ordinary audio for playback from a separate audio source (e.g., another audio cable) than the commands that are provided by the audio adjustment system 110a.

As used herein, the term "ordinary audio," in addition to having its ordinary meaning, can mean audio that would ordinarily be played back for listening on one or more speakers, such as music, audio associated with radio, television, online streaming videos, or movies, or the like. Thus, in some embodiments, the ordinary audio is not commands used to adjust the audio processing system 160. On the other hand, as mentioned above, such commands can be embedded in the ordinary audio using digital watermarking techniques or the like, some examples of which are described in U.S. Pat. No. 7,451,093, filed Sep. 9, 2004, titled "Systems and Methods of Remotely Enabling Sound Enhancement Techniques," the disclosure of which is hereby incorporated by reference in its entirety.

Although the audio adjustment system 110a is shown communicating bidirectionally with the audio device through both input and output jacks 114, 118, the audio adjustment system 110a may communicate unidirectionally with the audio device 140 in some embodiments. The connection between the audio adjustment system 110a and audio device 140 may be only from the audio output jack 114 to the audio input jack 142 of the audio device 140. In such embodiments, the audio adjustment system 110a merely sends commands to the audio device 140 to adjust audio enhancements of the audio processing system 160 in the audio device 140. Alternatively, the audio adjustment system 110a may be connected to the audio device 140 solely through the input jack 118 of the system 110a and output jack 146 of the audio device 140. In this configuration, the audio adjustment system 110a may gather data from the audio device 140, useful for such purposes as obtaining data from the audio processing system 160 for testing and evaluation purposes. However, it can be useful to have bidirectional communication between the audio adjustment system 110*a* and the audio device 140 to enable the audio adjustment system 110*a* to discover enhancement parameter settings of the audio processing system 160, test the audio processing system 160, and to adjust the settings of the audio processing system 160.

Turning to FIG. 1B, in the audio adjustment environment 100B, the audio adjustment system 110*b* and the audio device 140 include the same or similar features as the audio adjustment system 110*a* and audio device 140 in FIG. 1A. However, the audio adjustment system 110*b* communicates with the audio device 140 over a network 132, which may be a local area network (LAN), a wide area network (WAN) such as the Internet, combinations of the same, or the like. To enable the audio adjustment system 110*a* to communicate with the audio device 140 over the network 132, a network adapter 138 can be connected to the audio input and/or output ports 142, 146 of the audio device 140. Alternatively, or in addition to a network adapter 132, in some embodiments, the communications module 150 of the audio device 140 can include the functionality of the network adapter 132.

Like the audio adjustment system 110*a*, the audio adjustment system 110*b* includes the adjustment module 120 and a communications module 130*b*. The communications module 130*b* can use one or more network protocols, such as the TCP/IP protocol suite, to communicate with the network adapter 132. Upon receiving TCP/IP packets, for instance, the network adapter 132 can extract data from the packets and supply this data to the communications module 150. The communications module 150 can then decode the extracted data to identify one or more commands in the data. In another embodiment (not shown), the network adapter 132 includes some or all of the functionality of the communications module 150. Thus, for example, the network adapter 132 can decode the extracted data to identify one or more commands and pass the one or more commands directly to the audio processing system 160 through the audio input jack 142 (e.g., the audio device 140 may not include the communications module 150).

In still other embodiments, the network adapter 132 may be omitted if the audio device 140 is already network-enabled. Some televisions, for instance, include network functionality. Such televisions are commonly called Internet-enabled televisions and have an Ethernet port or wireless interface for communicating over a network. Other devices can be modified to include an equivalent of the network adapter 132 within the audio device 140 instead of connected to the audio device 140.

The network adapter 132 can advantageously enable an FAE or other person to communicate with an audio device 140 remotely for remote support, testing, or update purposes. A technical support agent using a device that implements the audio adjustment system 110*b*, for instance, may instruct a user of the audio device 140 to connect an audio cable between the network adapter 132 and the user's network-connected computer or router. Over this connection, the customer can download instructions (e.g., an MP3 file or streamed instructions) to the audio processing system 160 from the audio adjustment system 110*b*. The audio processing system 160 in the audio device 140 may communicate diagnostic information to the technical support personnel over the audio cable and over the network 132.

FIG. 2 illustrates an example audio adjustment user interface 200. The user interface 200 can be generated by the adjustment module 120 described above. The user interface 200 can be output as a graphical user interface in a stand-alone application or in a browser as a web page. Further, the user interface 200 can be output in a user device such as a mobile application on a mobile phone, tablet, or other mobile device.

The example user interface 200 shown includes a menu 202, a test pane 210, and an adjustment pane 220. The menu 202 provides file and audio options for performing general file management, such as loading and saving audio files. In addition, the menu 202 can provide options for processing audio files offline for testing purposes (using a program such as Adobe Audition™ or the like), such as in the user device, rather than in the audio device 140. The menu 202 may also include various presets for adjusting a plurality of enhancement settings (described below). Further, the menu 202 can include options for selecting the sound card of the user device so that the audio adjustment system 110*a* can communicate with the appropriate sound card driver.

The test pane 210 includes user interface controls 211 for playing audio files through the audio processing system 160 of the audio device 140 for testing purposes. These user interface controls 211 include playback, rewind, and stop buttons, as well as presets and bypass buttons. The playback, rewind, and stop buttons can be used for playing back, rewinding, or stopping an audio file 212 in the audio device 140 or in the user device. In addition, a slider button 215 allows the audio file 212 to be cued to any point of the audio file 212. Such controls 211 allow a user to test the audio processing system 160. Left and right 214 bar graphs indicate the output of the audio file on left and right speakers in either the audio device 140 or the user device. The presets button allows presets for adjusting a plurality of enhancement settings (described below). The bypass button allows audio processing to be performed directly in the audio device 140, rather than in the user device.

The adjustment pane 220 includes user interface controls 222, 224, 226 for adjusting parameters of enhancements in the audio processing system 160. In the adjustment pane 220, various tab controls 222 list names of different audio enhancements stored in the audio processing system 160. The adjustment module 120 can obtain the names of audio enhancements stored in the audio processing system 160 and populate the tab controls 222 with these names. Alternatively, the adjustment module 120 can output all available enhancement names on the tab controls 222, and only those enhancements stored in the audio processing system 160 can be accessed using the tab controls 222. User selection of one of the tab controls 222 can result in the adjustment module 120 outputting parameter adjustment controls 224 for the relevant audio enhancement. A master enable control 221 can have the same functionality as the bypass button described above, allowing audio processing to be performed directly in the audio device 140 rather than in the user device.

In the example embodiment shown, the selected tab control 222 is the "Master Controls." The master controls can adjust parameters that affect some or all of the audio enhancements in the audio processing system 160. The parameter adjustment controls 224 shown for these master controls include sliders 225 and text input boxes 227 for adjusting such parameters as input gain, output gain, bypass gain, and headroom gain. These gains can be applied to any enhancement implemented by the audio processing system 160. A submit changes button 226 enables a user to submit the parameter adjustments made using the controls 224 to the audio device 140. User selection of the submit changes button 226 can cause the adjustment module 120 to send the user-adjusted parameter values to the audio device 140 using the communication system 130a or 130b described above.

A current settings control 230 can be selected by a user to cause the adjustment module 120 to query the audio processing system 160 for current enhancement settings. The current settings control 230 can cause the adjustment module 120 to obtain values for parameters for each of the audio enhancements represented by the tab controls 222 or solely for the current enhancement (or master controls) highlighted by selection of the current tab control 222. The adjustment module 120 can change the parameter adjustment controls 224 to reflect the current settings in the audio processing system 160, thereby allowing a user to see the current settings and then make changes accordingly. In other embodiments, the adjustment module 120 automatically obtains and outputs the current settings of the audio processing system 160 upon communicating initially with the audio device 140. The current settings control 230 may, but need not, be omitted in such embodiments.

In addition to those parameters shown, additional examples of parameters that may be adjusted or tuned include any gain value, filter coefficients, parametric equalization coefficients, equalizer band levels, left-right channel balance, surround sound balance, decoder settings, encoder settings, and speaker-specific settings. For example, the user interface may permit adjustment of any of the audio enhancement parameters described in any of the following U.S. Patents and Patent Publications, among others: U.S. Pat. Nos. 5,319,713, 5,333,201, 5,459,813, 5,638,452, 5,912,976, 6,597,791, 7,031,474, 7,555,130, 7,764,802, 7,720,240, 2007/0061026, 2009/0161883, 2011/0038490, 2011/0040395, and 2011/0066428, each of the foregoing of which is hereby incorporated by reference in its entirety.

Further, in addition to providing slider controls 225, text box controls 227, and the like for adjusting enhancement parameters, in some embodiments the user interface 200 can enable a user to upload an audio file containing instructions or commands for changing a plurality of parameters. This upload functionality can be useful if a variety of parameters need to be changed for several devices, freeing the user from having to adjust a slider or text box for each of the parameters on each device. The commands in the audio file can be formatted, for instance, using the encoding techniques described below.

III. Encoding and Decoding Embodiments

Figure 3:
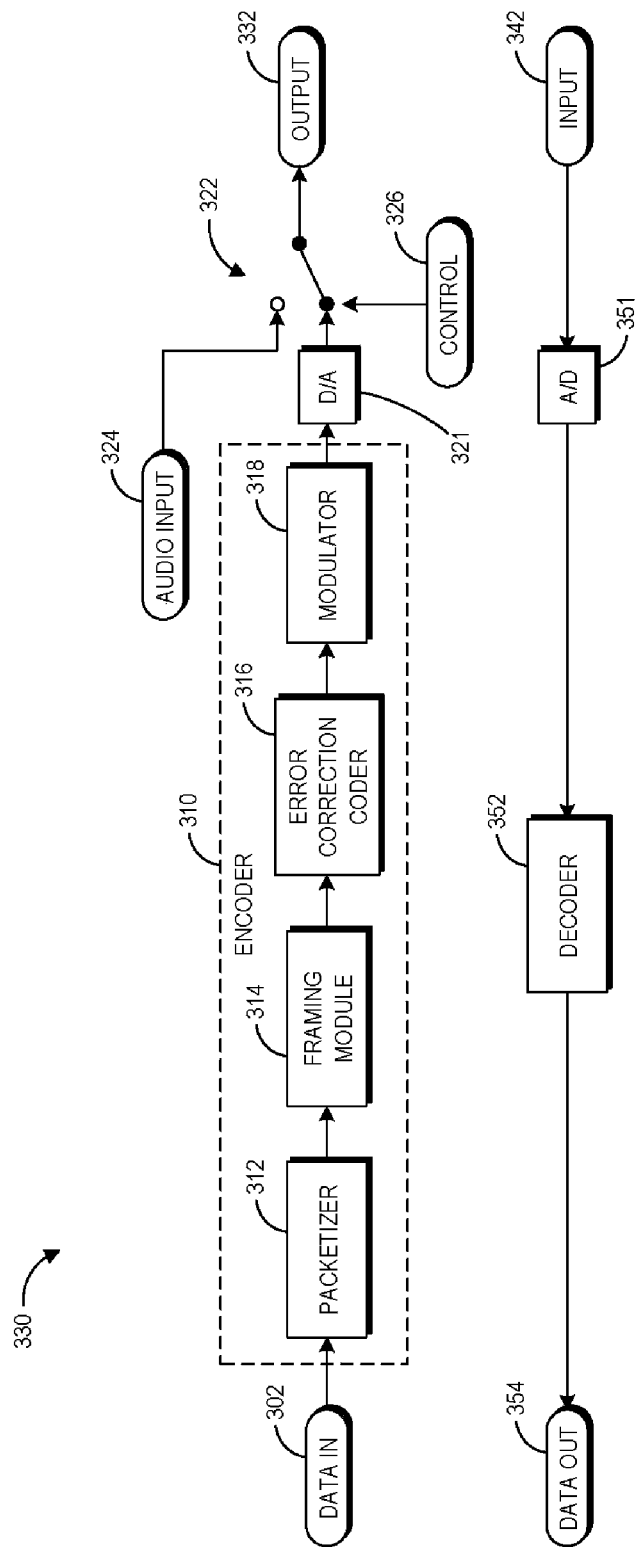
FIG. 3 illustrates audio encoding features in the context of an embodiment of an audio communications module.

FIG. 3 illustrates audio encoding features in the context of a more detailed view of the communications module 130a, namely a communications module 330. Like the communications module 130a, the communications module 330 can be implemented in the audio adjustment system 110a of an FAE device or the like. In the depicted embodiment, the communications module 330 includes components for sending and receiving data, commands, and the like to and from an audio device such as the audio device 140.

The communications module 330 receives input data 302 from the adjustment module 120 and provides this data 302 to an encoder 310. The data 302 received from the adjustment module 120 can include any of the data described above, including, for example, enhancement settings and commands input by the user of the user interface 200. The encoder 310 encodes the data 302 for transmission to the communications module 150 in the audio device 140. Advantageously, in certain embodiments, the encoder 310 can encode the data 302 into an audio signal that can be interpreted by the audio device 140. The communications module 330 can be implemented in hardware and/or software.

In the example embodiment shown, the encoder 310 includes a packetizer 312 that initially receives the data 302 and forms the data into packets. The packetizer 312 can use any suitable protocol to create the packets. A non-limiting example packet structure is describe below with respect to FIG. 9. These packets need not be TCP/IP packets; rather, the packets can generally be groupings of the data 302 into groups of bits or bytes organized for transmission. However, in some embodiments, the packets are formatted according to one or more protocols in the TCP/IP suite of protocols. The packetizer 312 forwards the packets to a framing module 314, which can organize a group of packets into one or more frames. The packet-frame structure provided by the packetizer 312 and framing module 314 can be similar to the packet-frame structure provided by many data link-layer protocols in the OSI model of computer networking or the TCP/IP network reference model. Even if the entire TCP/IP network stack is not used, the communications module 330 can use one or more link layer protocols to communicate with the communications module 150 in the audio device 140, such as the point-to-point (PPP) protocol, high-level data link control (HDLC) protocol, Cisco-HDLC protocol, or Ethernet protocol. Further, the communications modules described herein may also use wireless communications protocols to communicate wirelessly.

Each frame (or a subset thereof) can include a preamble that indicates that the audio signal includes commands or data. The communications module 150 in the audio device 140 can listen for the preamble, and commence decoding of the audio signal in response to detecting the preamble. The preamble can include a short set of bits that have a specific pattern, or audio formatted according to specified frequencies, or the like. The preamble can also be more complex than a short set of bits and may include a passcode, password, or other authentication information, such as encryption keys. More detailed embodiments of the preamble are described below.

The framing module 314 outputs one or more frames to an error correction coder 316. The error correction coder 316 can apply any error correction coding or forward error correction technique to the frames. For example, the error correction coder 316 can apply any block code or convolutional code, such as Reed-Solomon coding, Hamming coding, the Viterbi algorithm, combinations of the same, or the like. By applying error correction coding, the error correction coder 316 can enable the communications module 150 in the audio device 140 to correct bit errors in the received signal. Error correction coding is optional in some embodiments, and thus the error correction coder 316 can be omitted.

Figure 4:
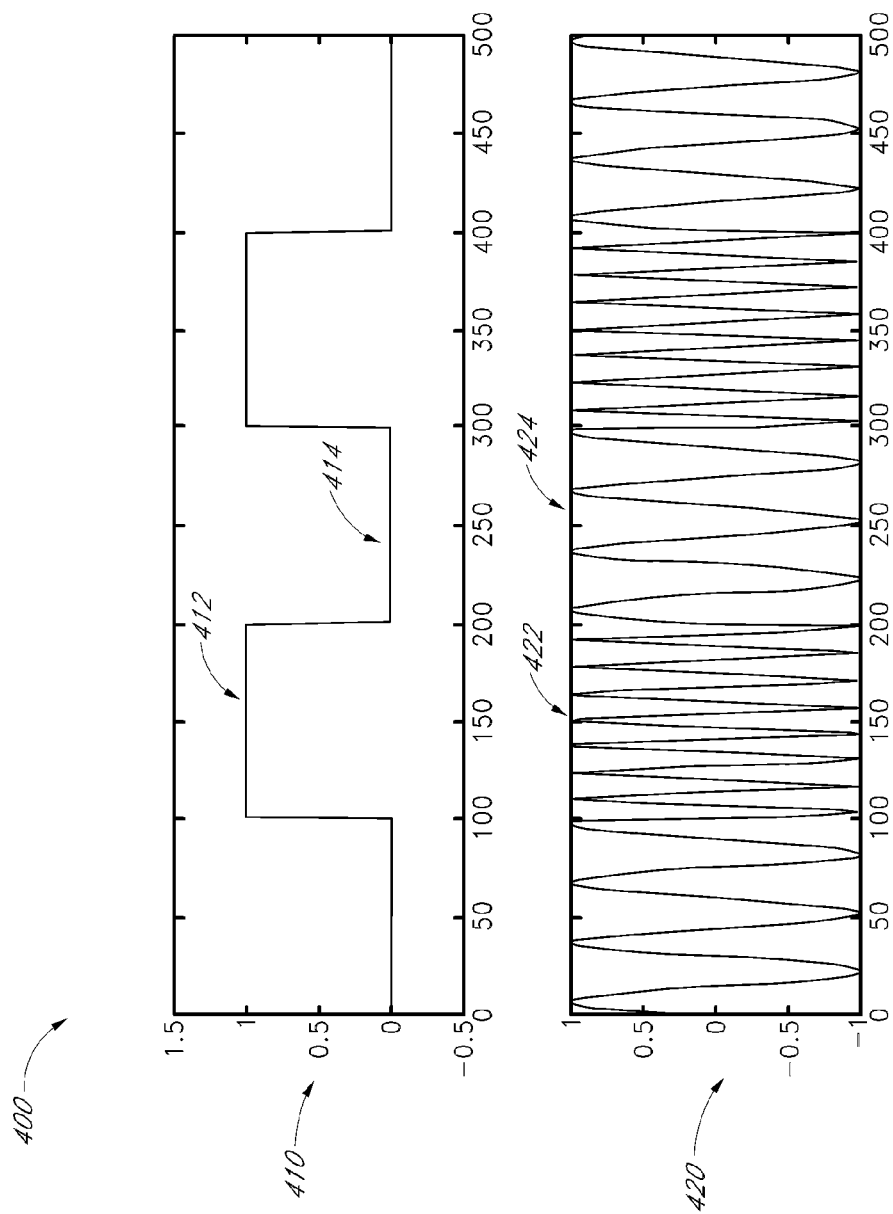
FIGS. 4 and 5 illustrate example audio modulation formats.
Figure 5:
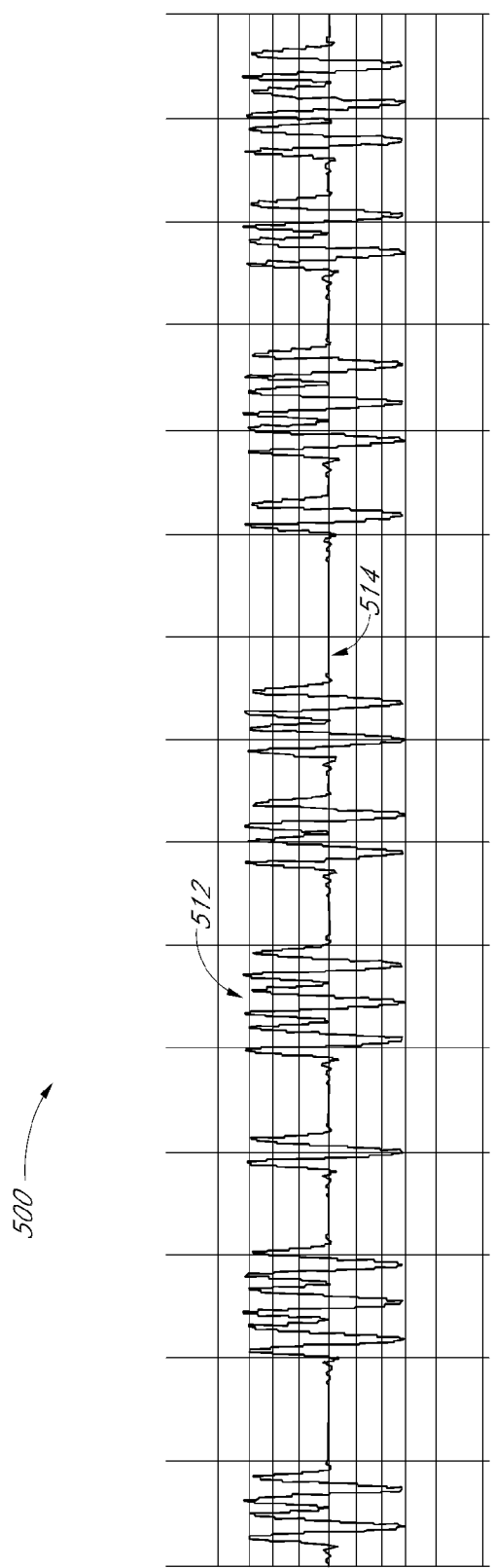

The error correction coder 316 outputs an encoded audio signal to a modulator 318. The modulator 318 can perform a modulation of the encoded audio signal to prepare the encoded audio signal for transmission to the audio device 140. One modulation scheme that the modulator 318 can use is audio frequency shift keying (AFSK), which uses two frequencies to represent different bits. AFSK can be understood in the context of an example plot 400 shown in FIG. 4, where the top graph 410 of the plot corresponds to a digital signal (e.g., output by the coder 316) and the bottom graph 420 represents the AFSK-encoded signal. In the digital signal, a mark 412 can represent a "1" binary value while a space 414 can represent a "0" binary value. Different frequencies 422, 424 are used to represent the mark 412 and space 414 in the AFSK-encoded signal. FIG. 5 illustrates another example plot 500 where a first frequency 512 represents a mark and the second frequency 514 is zero, representing a space. This form of AFSK can also be equivalent to amplitude-shift keying (ASK).

Although AFSK is the modulation scheme described in this example, the modulator 318 can use other modulation schemes, some examples of which can include Quadrature Amplitude Modulation (QAM), Phase-Shift Keying (PSK), Frequency Modulation (FM), Amplitude Modulation, spread-spectrum techniques, combinations of the same, and the like. Alternatively, the encoded audio signal output by the error correction coder 316 can be line coded for digital baseband transmission instead of modulated by a carrier signal. Line coding techniques that can be used, among others, include Manchester coding, non-return-to-zero (NRZ) coding, and pulse amplitude modulation.

In the depicted embodiment, the modulator 318 outputs a modulated audio signal to a digital to analog (D/A) converter 321, which converts the audio signal to an analog audio signal. The D/A converter 321 can be omitted in some embodiments. In other embodiments, the D/A converter 321 is not part of the communications module 330, but is rather part of a sound card or other device in the device that implements the audio adjustment system 110. The output of the D/A converter 321 is provide to a switch 322, which outputs the audio signal as an output signal 332 or which alternatively outputs an ordinary audio signal 324, depending on a control setting 326. The ordinary audio signal 324 can correspond to the file 212 described above with respect to FIG. 2. Thus, the communications module 330 can switch between sending commands and ordinary audio data (e.g., for testing of the audio processing system 160) to the audio device 140. The control setting 326 can be actuated by a user to switch between ordinary audio input 324 and command input, for example, in response to user selection of an appropriate menu setting in the user interface 200 or the like.

The communications module 330 could be modified in certain embodiments to include a TCP/IP stack so as to incorporate the features of the communications module 130b of FIG. 1B. To do so, in one embodiment, the D/A converter 321 could be replaced with a networking module that encapsulates the output of the modulator 318 in TCP/IP packets.

The encoder 310 can be used in general to transmit data, including commands, to the audio device 140. A decoder 352 is also provided in the depicted embodiment of the communications module 330 for decoding data received from the audio device 140. An analog input signal 342 from the audio device 140 is provided to an analog-to-digital converter 351, which converts the analog input signal 342 into digital format for decoding by the decoder 352. The decoder 352 decodes the digital signal to output data 354, which can be provided to the adjustment module 120 for presentation to a user or for storage in computer data storage. The functionality of the decoder 352 can correspond to a similar decoder in the audio device 140, which is described below with respect to FIG. 6.

Figure 6:
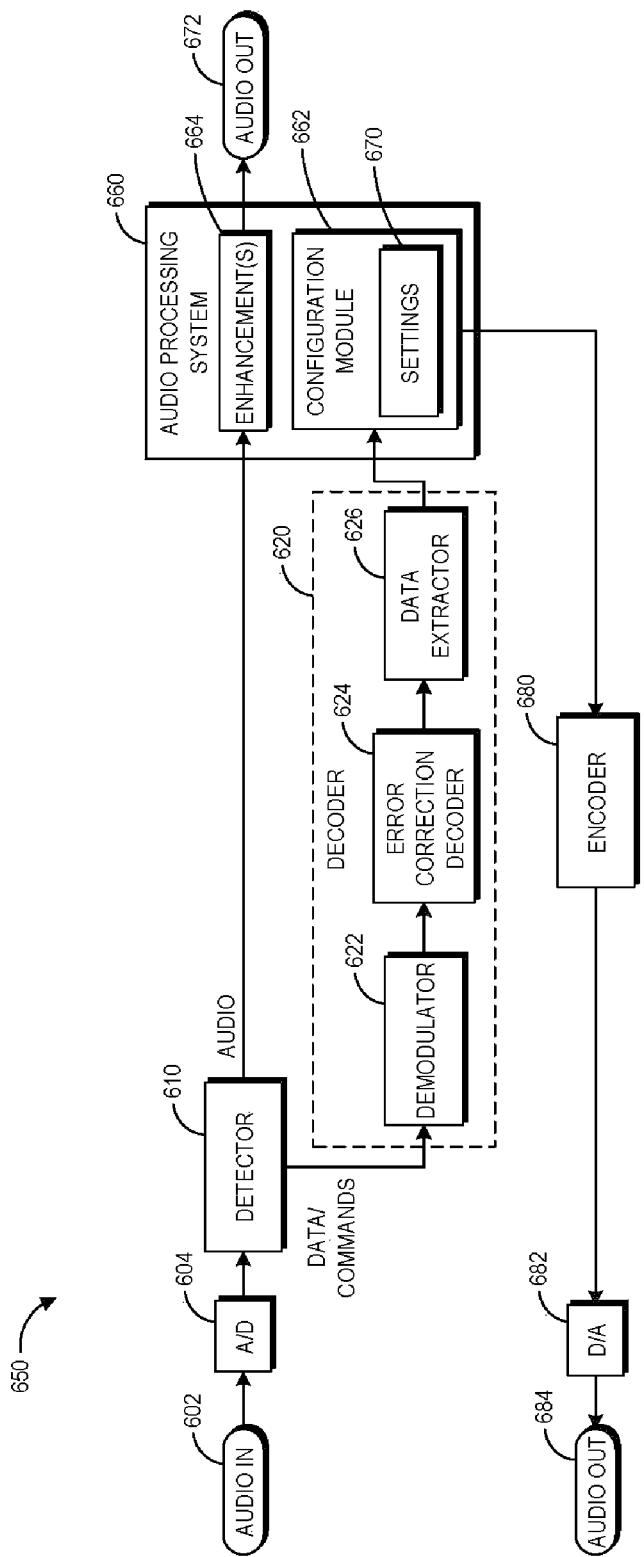
FIG. 6 illustrates audio decoding features in the context of another embodiment of an audio communications module.

FIG. 6 illustrates audio decoding features in the context of a more detailed view of the communications module 150, namely a communications module 650. Like the communications module 150, the communications module 650 can be implemented in the audio device 140. The communications module 650 includes components for sending and receiving data, commands, and the like to and from an audio adjustment system such as the audio adjustment system 110a. Advantageously, in certain embodiments, the communications module 650 can enable an audio processing system 660 to adjust the settings of various enhancements based on the received data or commands.

In the depicted embodiment, the communications module 650 includes an analog-to-digital converter (A/D) 604, which receives the input signal 602 in analog form and outputs a digital signal. The A/D 604 provides the digital signal to a detector 610. However, the A/D 604 may be omitted in embodiments where the input signal 602 is digital, such as when the output signal of the communications module 330 is digital (and the D/A 321 can be omitted as well).

The detector 610 can analyze the digital signal output by the A/D 604 to determine whether the signal includes data or commands or whether the signal includes ordinary audio. If the signal includes data or commands, the detector 610 can pass the data/commands to a decoder 620. If the signal includes ordinary audio instead of data or commands, the detector 610 can pass the ordinary audio to the audio processing system 660, which may apply one or more enhancements 664 to the audio. In some implementations, the detector 610 mutes the output of the detector 610 that would ordinarily go to the audio processing system 660 when data or commands are received. Muting this audio processing path can allow the data or commands to be processed without outputting a modulated audio signal (e.g., AFSK-modulated) to speakers. However, in other embodiments, the detector 610 does not mute the output, such that the modulated audio signal is able to be output by the speakers. The adjustment module 120 can provide, in a user interface, an option for a user to mute or unmute the output of the audio device 140 in response to receiving data or commands in some embodiments.

Figure 7:
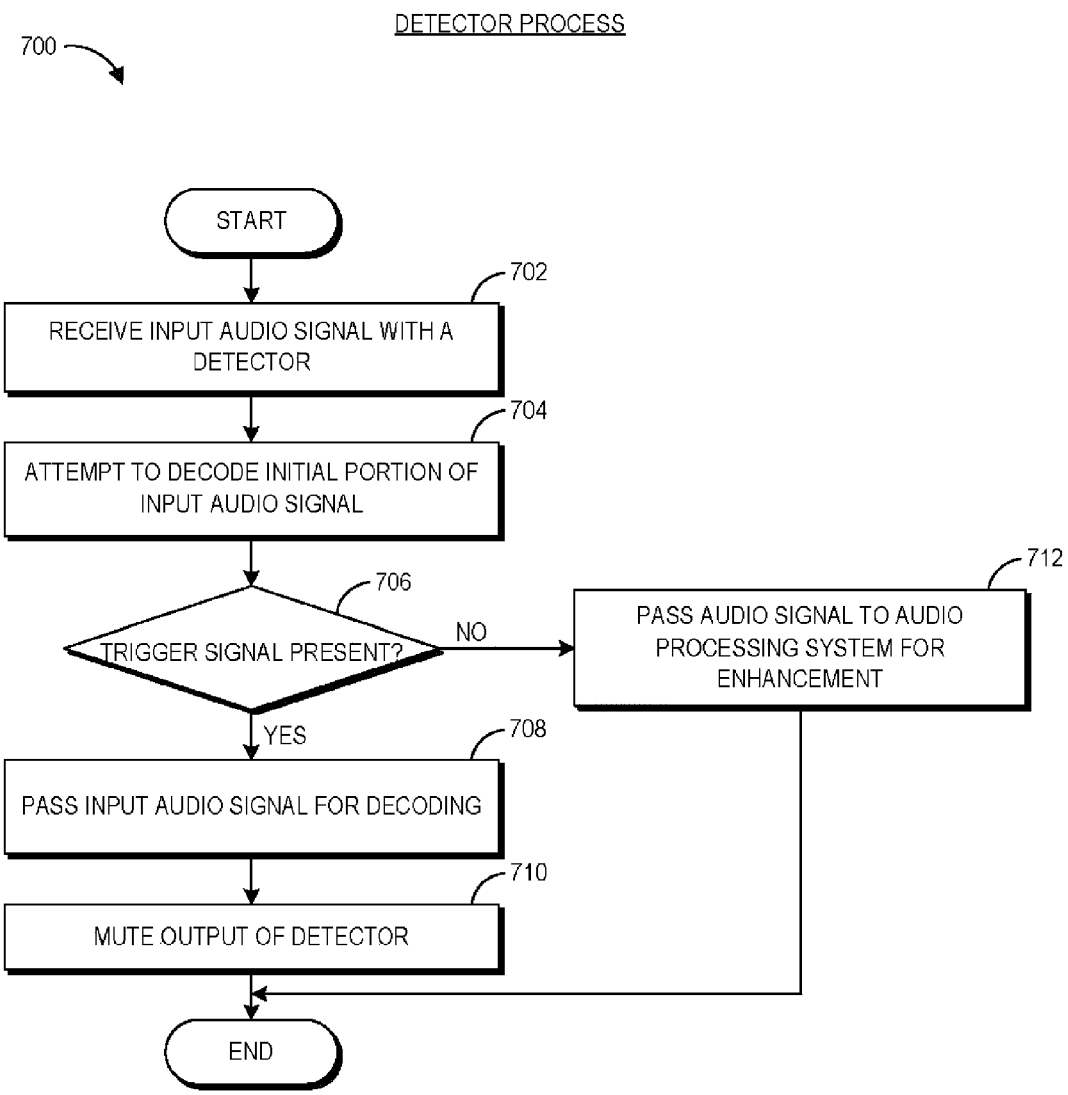
FIG. 7 illustrates an embodiment of an audio communications signal detector process.

The features of the detector 610 are described in greater detail with respect to FIG. 7. Referring to FIG. 7, an embodiment of an audio data signal detector process 700 is shown. For convenience, the process 700 is described as being implemented by the detector 610, although the process 700 could also be implemented by other hardware or software not shown. At block 702 of the process 700, an input audio signal is received with the detector 610.

At block 704, the detector 610 attempts to decode an initial portion of the input audio signal. In doing so, the detector 610 can attempt to identify a preamble of the audio signal that includes a trigger signal indicative of the presence of data or commands in the audio signal. In general, the trigger signal may include one or more different frequencies of audio that indicate that the audio signal contains data or commands. For instance, the trigger signal may include two different frequencies of audio. The trigger signal may also include a more complex pattern of frequencies and cycles of those frequencies that can act as a passcode or the like.

The detector 610 can attempt to decode or otherwise detect this trigger signal by in any of a variety of ways. In one embodiment, the detector 610 checks zero crossing intervals in the audio signal to determine whether the detected zero crossing intervals correspond to expected trigger signal frequencies. In detecting these frequencies, the detector 610 can also detect a number of cycles of each frequency to determine whether the number of detected cycles corresponds to an expected number of cycles. The detector 610 can also evaluate the signal power of the input signal to determine whether the signal power corresponds to an expected signal power. Different frequencies in the triggering signal may, for instance, have different power levels. Further, in some embodiments, the detector 610 checks whether frequency values, cycles, and/or signal power are within a certain tolerance of expected values in case the input signal is corrupted. Thus, the detector 610 can allow the input signal to be decoded even if the trigger signal varies from the expected trigger signal within certain tolerance(s). Moreover, the detector 610 can use other techniques to detect the trigger signal in other embodiments.

If the trigger signal is present in the audio signal (block 706), the detector 610 passes the input audio signal to the decoder 620 for decoding at block 708. The detector 610 can also optionally mute the output of the detector at block 710 so that a user will not hear the noise associated with modulated signals. Otherwise, at block 706, if the detector 610 does not detect the trigger signal, the detector passes the audio signal to an audio processing system 660 for enhancement at block 712.

Because of the detector 610, the audio device 140 incorporating the communications module 650 does not need to have a different mode for tuning in certain embodiments. Without the detector, for instance, a user might have to select an option in the audio device 140 to turn the audio device 140 to tuning mode so that the audio device 140 would know to process data or commands instead of ordinary audio. Thus, the detector 610 can advantageously increase the ease of use of adjusting the audio device 140. In addition, the possibility of misdetection by the detector 610 is low because ordinary audio is unlikely to have the same specific structure as the trigger signal. Even if a false detection were to occur, the decoder 620 (described below) can perform a cyclic redundancy check (see also FIG. 9) and determine that a mis-detected signal is actually ordinary audio. To further avoid misdetection, in some embodiments, the detector 610 can include functionality that enables a user to disable the detector once manufacturing testing has completed. As a result, the detector 610 and decoder 620 may be rendered inoperative for production to reduce or eliminate the chance of a misdetection.

Turning again to FIG. 6, the audio signal passes from the detector 610 to the decoder 620 in situations where the audio signal includes data or commands. The decoder 620 includes a demodulator 622, an error correction decoder 624, and a data extractor 626. The demodulator 622 demodulates the signal received from the detector 610. The demodulation technique used by the demodulator 622 can be related to the modulation technique used by the modulator 318 of FIG. 3. For instance, if the modulation scheme used by the modulator 318 was AFSK modulation, the demodulator 622 can perform AFSK demodulation. The error correction decoder 624 can decode the demodulated signal to recover the error-correction encoded frames and correct any detected errors if possible. The data extractor 626 can demultiplex the error-corrected signal to recover individual frames and packets within those frames to extract the data or commands in the audio signal. The data extractor 626 can provide the data or commands to the audio processing system 660.

The audio processing system 660 is a more detailed embodiment of the audio processing system 160 and can include all the features thereof. A configuration module 662 of the audio processing system 660 receives the data or commands from the decoder 620 and implements the data or commands. For instance, the configuration module 662 can update settings 670 of the enhancements 664 based on the data or commands. Some commands request information about the settings instead of changing the settings 670, in which case the configuration module 662 can return the requested information to an encoder 680. The encoder 680 can have the same or similar functionality as the encoder 310 of FIG. 3. The encoder 680 can output an encoded signal to a D/A 682, which can output an audio signal 684 for transmission to the audio adjustment system 110*a* (or communications module 330).

Figure 8:
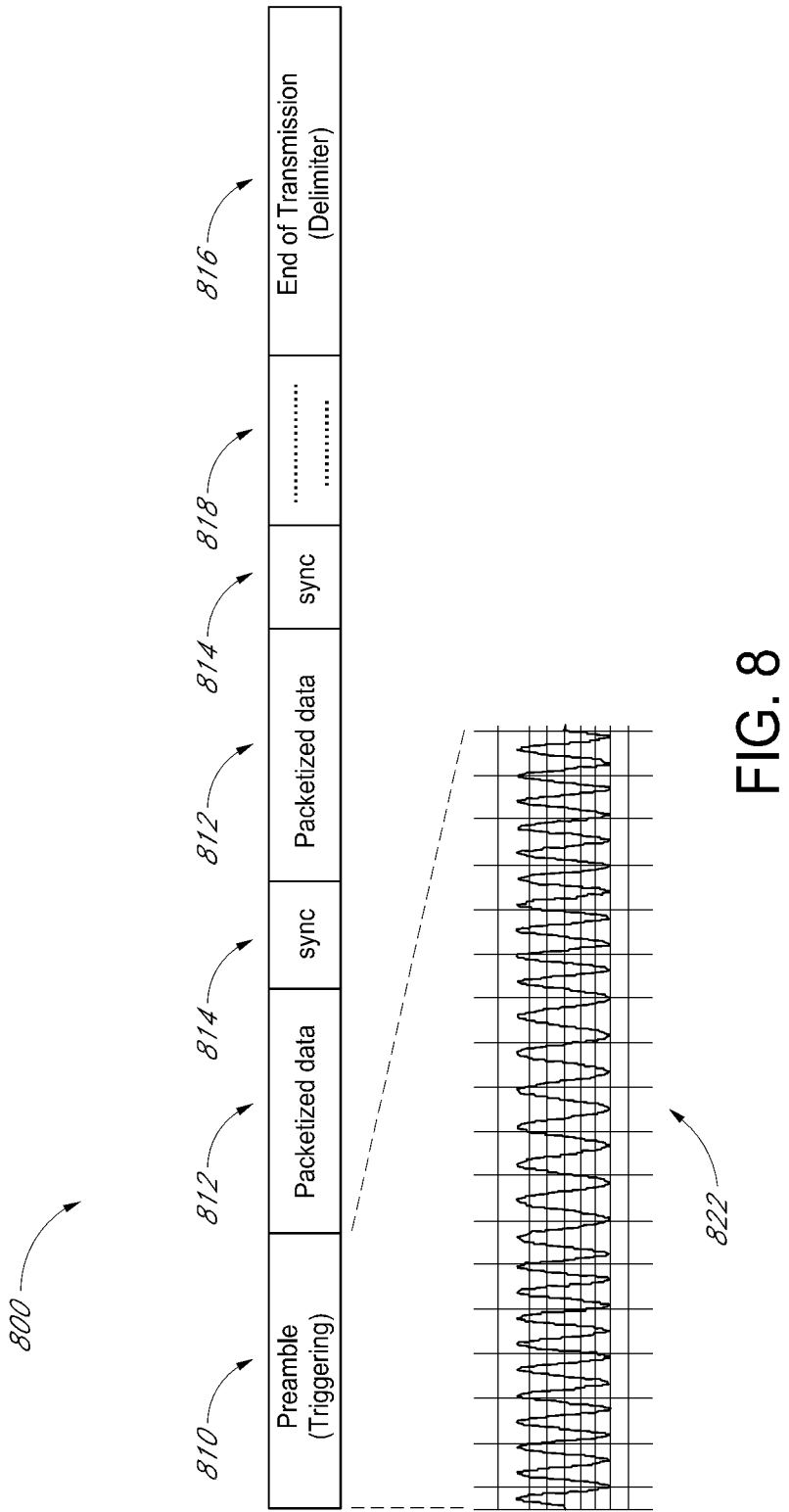
FIG. 8 illustrates an example frame structure of an audio communications signal.

FIG. 8 illustrates an example frame 800 of an audio communications signal. The frame 800 can be output by any of the encoders or communications modules described above. The frame 800 includes a preamble 810 at the start of the frame, followed by packetized data or packets 812 interspersed with synchronization (sync) data 814 until an end of transmission delimiter 816. In an embodiment, the communications modules described herein work in asynchronous mode, and therefore the sync data 814 can enable the receiving communications module to re-trigger and thereby maintain appropriate timing. In some embodiments, syncing can be performed using other portions of the signal, and thus, the sync data 814 can be removed (e.g., not transmitted) in those embodiments.

The end of transmission delimiter 816 indicates that there is no further data in the frame 800, although the delimiter 816 does not preclude further frames from being transmitted. The delimiter 816 can have the same structure as the packets 812, described below with respect to FIG. 9. Thus, for example, the delimiter 816 can be a packet having an address that represents end of transmission. Ellipses 818 indicate that any amount of packetized data 812 and sync data 814 can be included in the frame 800.

The preamble 810 is shown in greater detail by the expanded segment 822. In the expanded segment 822, a trigger signal is shown that includes multiple cycles of different frequencies. The trigger signal in the depicted embodiment includes two cycles of a first frequency, followed by two cycles of a second frequency, followed by two additional cycles of the first frequency. In one example embodiment, the first frequency has a value of Fs/20, where Fs is a sampling frequency used by the transmitting communication module, and the second frequency has a value of Fs/40. Other values may be chosen, and in general, the trigger signal may have a variety of different features than the example trigger signal shown.

In addition to providing functionality for detecting a signal with commands rather than ordinary audio, the trigger signal can have other purposes as well. In one embodiment, the trigger signal provides data synchronization for the communications module 150/650. The communications module 150/650 may operate asynchronously, without a clock signal from the sending communications module 130/330, and thus may use the trigger signal to synchronize timing with the incoming data. By synchronizing with the trigger signal, in certain embodiments the communications module 150/650 is able to properly decode the incoming signal. In addition, the communications module 150/650 can detect an amplitude level of the trigger signal and use this amplitude level as a reference for amplitude modulation decoding. As described above, in some embodiments, the communications signal may have some form of amplitude modulation, in addition to or instead of frequency or phase modulation. The level of the audio input signal can vary, however, due to differing output levels of transmitting devices, input levels of the receiving device, imperfections in the transmission channel, and the like. Thus, the communications module 150/650 can detect the level of the trigger signal and use this level as a reference level for decoding amplitudes of the remainder of the incoming signal. For instance, in one embodiment, the communications module 150/650 considers the level of the trigger signal as a logic "1", such that remaining signal that has the same or similar signal level is also a logic "1". However, the communications module 150/650 can also consider the level of the trigger signal to be a logic "0".

Figure 9:
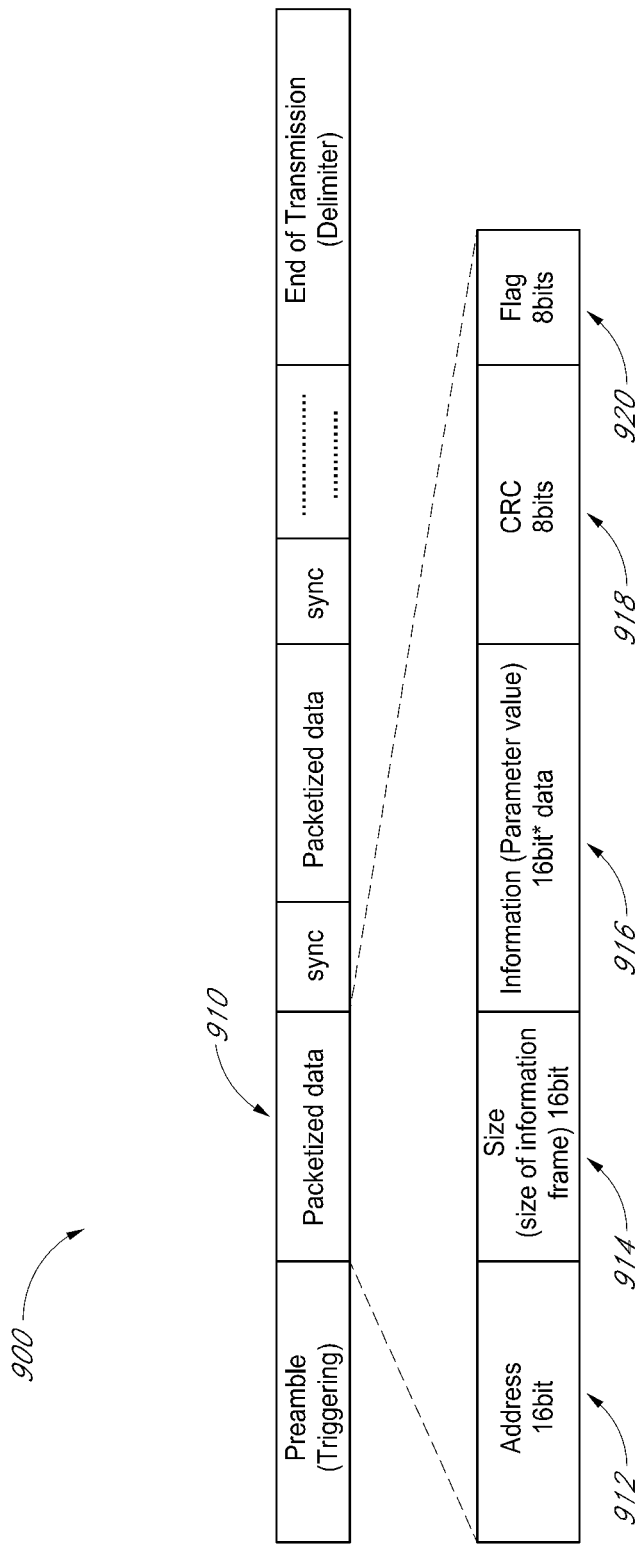
FIG. 9 illustrates an example packet structure of an audio communications signal.

FIG. 9 illustrates an example packet 900 of an audio communications signal. The example packet 900 is a more detailed example of the packetized data 812 of FIG. 8. In the depicted embodiment, the packet 900 includes packetized data 910 that has an address field 912, a size field 914, an information field 916, a cyclic redundancy check (CRC) field 918, and a flag field 920. Example sizes for each field are also shown, although these size values can vary considerably in many embodiments.

The address field 912 can define the enhancement technology to be modified and/or the type of data to be transferred to the audio device 140. Bit masking can be used to analyze the address. For instance, the address field 912 can be organized with different bits assigned as follows: bank (4 bit)|technology ID (6 bit)|parameter ID/Range (6 bit), for 16 bits of total address size. The bank portion of the address can refer to a mode for which a particular technology is being adjusted, such as for movies, television, or pure audio. The technology ID can refer to a particular audio enhancement, whereas the parameter ID/Range can refer to a particular coefficient, gain value, or other tuning value or range to be adjusted (see list of example tuning parameters above). As an example, the address value 0001 0000 0100 0011 might correspond to the following: bank: movie mode, technology ID: adaptive equalization, and parameter ID: finite impulse response (FIR) filter coefficient.

In other embodiments, the bank portion of the address may be omitted. In still other embodiments, bit masking is not used in the address, and instead, each address is a transmission ID. Different transmission IDs can represent different commands. The transmission IDs can include general commands (e.g., for error control, such as acknowledgement (ACK) commands, CRC-related error reporting, etc.) and enhancement technology specific commands.

The size field 914 can specify the size of the data payload or information field 916, as the size of the information field 916 may vary. The information field 916 can include the actual data to be transferred. In the address example above, this data can be the actual coefficient or coefficients of a FIR filter. The CRC field 918 includes a CRC or checksum value that represents a hash of the packet for error detection purposes. The decoder 620 can detect an error in the CRC field 918 and apply error correction or fail to decode the packet if the packet is too corrupt. The flag field 920 can have a variety of uses, one example of which is including an end of packet delimiter, similar to the end of transmission delimiter in the frame (see FIG. 8).

Figure 10:
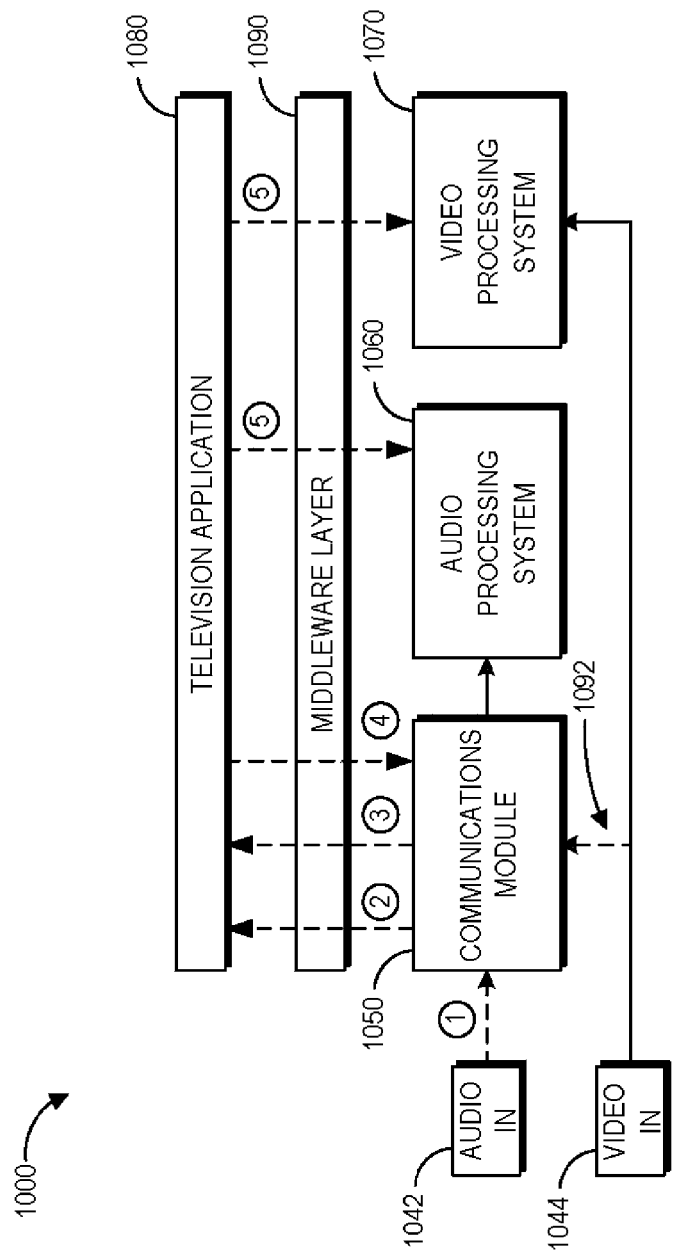
FIG. 10 illustrates an embodiment of an audio-visual adjustment system implemented in a television.

FIG. 10 illustrates an embodiment of an audio-visual adjustment system 1000 implemented in a television. The audio-visual adjustment system 1000 can include any features of the audio adjustment systems and audio devices described above. For example, a communications module 1050 of the audio-visual adjustment system 1000 can receive an audio communications signal, extract data from the signal, and use the data to adjust an audio processing system 1060. In addition, the audio-visual adjustment system 1000 can adjust a video processing system 1070, which receives video data from a video input port 1044. Each of the components shown in FIG. 10 can be implemented in hardware and/or software.

The audio-visual adjustment system 1000 receives an audio communications signal from an audio input jack 1042, which can be any of the audio input jacks described above. The audio communications signal is passed to the communications module 1050. The communications module 1050 can have all the functionality of the communications modules 150, 650 described above. Accordingly, the communications module 1050 can decode the audio communications signal to obtain instructions, data, or other information for adjusting the audio processing system 1060 and/or the video processing system 1070. Example adjustments to audio processing systems have been described above. Similar adjustments may be made to the video processing system 1070. Like the audio processing system 1060, the video processing system 1070 can implement signal processing algorithms, except that these algorithms process video. The audio-visual processing system 1000 can process the received instructions or data to adjust the performance of or otherwise change the operation of the video processing system 1070.

Also shown are a television application 1090 and a middleware layer 1080. The television application 1090 can be a controller application that generally controls or operates the television in which the audio-visual adjustment system 1000 is implemented. The television application 1090 can be provided by a manufacturer of the television and may control such functions as channel settings, volume settings, display settings, and so forth. The middleware layer 1080 can include features provided by the television manufacturer for interacting with the television application 1080. For instance, these features can include an application programming interface (API) that can be used by the communications module 1050 to communicate with the television application 1080. In addition, the middleware layer 1090 can include an API provided by the provider of the audio processing system 1060 (or by the television manufacturer) that can provide access to the audio processing system 1060 and/or video processing system 1070 from the television application 1080.

In previous FIGURES, such as FIG. 6, the audio processing system 660 internally adjusted its settings based on the input received by the communications module 650. In contrast, the television application 1080 of the audio-visual adjustment system 1000 can externally adjust the audio processing system 1060 and/or the video processing system 1070 based on the input received by the communications module 1050. While it is possible to use the approach of FIG. 6 to adjust the audio processing system 660 in a television, many television manufacturers wish to retain control over changes to settings in their televisions. Thus, the communications module 1050 can cooperate with the television application 1080, through the middleware layer 1090, to adjust the audio processing system 1060 and/or video processing system 1070. Further, in some embodiments, the middleware layer 1090 can be omitted, and the communications module 1050 and audio/video processing systems 1060, 1070 can communicate directly with the television application 1080.

An example flow of information or change of states in the audio-visual adjustment system 1000 is indicated by dashed arrows numbered 1-5. In state 1, the communications module 1050 receives an audio communications signal from the audio input jack 1042 and decodes the signal. Before, during, or after decoding, in state 2, the communications module 1050 can notify the television application 1090 that the signal has been received. Once the transmission has been completely received, the communications module 1050 can notify the television application 1090 that the transmission is complete at state 3. In each of these states 2 and 3, the communications module 1050 can access API functions in the middleware layer 1090 to communicate this state information to the television application 1080.

In state 4, the television application 1080 can fetch the data associated with the received transmission from the communications module 1050, using, for example, one or more API functions in the middleware layer 1090. The fetched data can include instructions, commands, or the like for adjusting or obtaining information from the audio and/or video processing systems 1060, 1070. The television application 1080 can then use the fetched data at state 5 to perform the instructions or commands on the audio and/or video processing systems 1060, 1070. In doing so, the television application 1080 can use one or more API functions to implement the instructions or commands. For example, if a received command indicates that an audio setting should be set to a certain value in the audio processing system 1060, the television application 1080 can call a "SET" function or the like the middleware layer 1090, which sets the value in the audio processing system 1060. Example functions that the middleware layer 1090 can provide to the television application 1080 include commands to set parameters in the systems 1060, 1070, get parameters in the systems 1060, 1070 (e.g., for transmission to a user device), initialize parameters, store or erase data, or the like.

In some embodiments, the communications module 1050 receives instructions from the video input port 1044, as indicated by dashed line 1092. The communications module 1050 can use this information to adjust the audio and/or video processing system 1060, 1070 as described above. Further, the features of the audio-visual adjustment system 1000 can be generalized to any electronic device. Any electronic device may have a controller application like the television application 1080, which can receive instructions from the communications module 1050 and process these instructions to adjust or obtain data from any subsystem in the electronic device, including systems unrelated to audio or video processing.

IV. Additional Embodiments

More generally, the audio adjustment system 110 can permit any type of data to be transferred from one device to another, with or without a user interface. In addition to parameter adjustments, data transfers can include control data, instructions, audio content, firmware or software updates, hardware updates (such as FPGA or EEPROM reconfigurations), and the like. Further, any device can include an audio adjustment system 110, including an audio device. For instance, an audio-video receiver (AVR) can include an audio adjustment system 110 that communicates with an audio processing system installed in a television over one or more audio cables that connect the two devices. In one example scenario, the AVR includes the same audio enhancement technology that is included in the television. The AVR may process an audio signal with the audio enhancement and provide the enhanced audio to the television (or other speakers) for playback. The AVR may communicate to the audio enhancement system in the television a message, using the audio adjustment system, that indicates that the audio has already been processed by the audio enhancement. The television can then forego applying the enhancement in response to receiving the message. The message may (but need not) be sent to the television at the start of a program, for instance, to avoid interrupting audio playback of the program.

In another embodiment, a firmware update for the audio processing system 160 or audio processing system 160 can be communicated to the audio device 140 over a broadcast channel, such as a satellite or cable channel. The firmware update can be embedded in a television program as a spread-spectrum signal or as a digital watermark. The firmware update may instead be sent independent of a television program. The firmware update may include a synchronization signal or trigger signal, like the trigger signal described above or different therefrom, that causes the audio processing system 160 to recognize the communication of instructions. The trigger signal can thereby enable the audio processing system 160 to optionally mute or turn off the audio output so that the television loudspeakers do not output the AFSK (or other) signal. More generally, a first device communicating with an audio adjustment system installed in a second device can initiate a handshake with the second device prior to sending data to the audio processing system. The audio processing system (or the communications module in the audio device) can mute this handshake and subsequent data so as to avoid playing the accompanying AFSK (or other protocol) sounds over a loudspeaker.

In yet another embodiment, two audio devices can communicate any type of data with each other using aspects of the communication systems described above. For instance, two smartphones or other mobile devices can communicate via cables connected to the devices. However, speaker-to-microphone AFSK communication can be employed for faster or easier to use communication between the two devices. One of the devices can output an AFSK-modulated signal (using the communications module 130/330) to a speaker, which audibly (or ultrasonically) outputs the AFSK-modulated signal to the microphone of the other device. The receiving device can demodulate and decode the AFSK-modulated signal using the features of the communications module 150/650. Examples of data that can be communicated include audio parameters, virtual business cards, general calendaring and contact information, applications, and the like.

V. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical electronic storage or computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of communicating audio enhancement settings to an audio device, the method comprising:
   by a first device comprising one or more processors:
      outputting an adjustment user interface for presentation to a user, the adjustment user interface configured to provide functionality for a user to adjust audio enhancement parameters of one or more first audio enhancement settings installed in a second device, wherein the second device is a television;
      receiving, through the adjustment user interface, a selection from the user of adjusted values of a selected one of the audio enhancement parameters, the adjusted values comprising filter coefficients;
      encoding the adjusted values of the selected audio enhancement parameter in an analog audio signal that includes audio data; and
      communicating the analog audio signal to the second device through an audio output port of the first device to an audio input port of the second device as a first analog modulated signal, said communicating causing the second device to set the selected audio enhancement parameter to include the adjusted values,
   said encoding further comprising:
      including a trigger signal at the beginning of the analog audio signal to indicate to the second device that the analog audio signal includes the adjusted values of the selected audio enhancement parameter, the trigger signal comprising a predefined bit pattern configured to cause the second device to recognize that the analog audio signal comprises the adjusted values, decode the analog audio signal, and extract the adjusted values of the selected audio enhancement parameter while muting the predefined bit pattern from playback; and
      including additional data in the analog audio signal along with the trigger signal, said additional data configured to prevent the second device from misidentifying a presence of the trigger signal in the audio data;
   subsequent to said communicating, requesting and subsequently receiving, on an audio input port of the first device, as a second analog modulated signal from the second device, information on existing enhancement settings, including the adjusted values of the selected audio enhancement parameter; and
   outputting, on the adjustment user interface of the first device, the information on the existing enhancement settings.

2. The method of claim 1, wherein said communicating the analog audio signal to the second device comprises communicating the analog audio signal over a network to the second device.

3. The method of claim 1, wherein said communicating the analog audio signal to the second device comprises communicating the analog audio signal from a speaker of the first device to a microphone of the second device.

4. The method of claim 1, wherein said encoding comprises modulating the adjusted value with audio frequency shift keying (AFSK).

5. The method of claim 1, further comprising upon completion of the adjustment of audio enhancement parameters of one or more first audio enhancement settings installed in the second device, receiving, through the adjustment user interface, a selection that causes the second device to disable decoding of the analog audio signal and extraction of the adjusted value of the selected audio enhancement parameter.

6. The method of claim 1, wherein encoding the adjusted values of the selected audio enhancement parameter in an analog audio signal that includes audio data comprises:
  forming the audio data into packets;
  organizing the packets into one or more frames;
  applying an error correction coding to the one or more frames; and
  outputting an encoded audio signal to a modulator which performs a modulation of the encoded audio signal to prepare the encoded audio signal for transmission to the second device.

7. A system for communicating audio enhancement settings to an audio device, the system comprising:
  a first device comprising one or more processors configured to execute computer-readable instructions to:
    provide functionality for a user to adjust audio enhancement parameters of one or more first audio enhancement settings installed in a second audio device, wherein the second audio device is part of a television;
    receive a selection from the user of adjusted values of a selected one of the audio enhancement parameters, the adjusted values comprising filter coefficients;
    encode the adjusted value of the selected audio enhancement parameter in an analog audio signal that includes audio data and communicate the analog audio signal to the second audio device through an audio output port of the first device to an audio input port of the second audio device as an analog modulated signal, thereby enabling the second audio device to set the selected audio enhancement parameter to the adjusted values and play back the audio data,
    wherein said encoding comprises:
      including a trigger signal in the analog audio signal to indicate to the second audio device that the analog audio signal includes the adjusted values of the selected audio enhancement parameter, the trigger signal comprising a predefined bit pattern configured to cause the second audio device to recognize that the analog audio signal comprises data, decode the analog audio signal, and extract the adjusted values of the selected audio enhancement parameter while muting the predefined bit pattern from playback; and
      including additional data in the analog audio signal along with the trigger signal, said additional data configured to prevent the second audio device from misidentifying a presence of the trigger signal in the audio data;
    receive, on an audio input port of the first device, a second audio enhancement setting from the second audio device, the second audio enhancement setting comprising the adjusted values of the selected audio enhancement parameter; and
    communicate the second audio enhancement setting to the adjustment module to be outputted on an adjustment user interface of the first device.

8. The system of claim 7, wherein the adjustment module is further configured to provide functionality for the user to access values of the audio enhancement parameters currently set in the second audio device.

9. The system of claim 7, wherein one or more processors is further configured to execute the computer-readable instructions to encode the adjusted values using an error correction coder.

10. The system of claim 7, wherein the adjusted values further comprise one or more of the following: a gain value, a parametric equalization coefficient, an equalizer band level, a left-right channel balance, a surround sound balance, a decoder setting, an encoder setting, and a speaker-specific setting.

11. The system of claim 7, wherein the trigger signal represents a passcode.

12. The system of claim 7, wherein the one or more processors is further configured to execute computer-readable instructions to: receive the audio data and forming the audio data into packets in accordance with TCP/IP protocols; organize the packets into one or more frames; and perform of a modulation of the packets to prepare for transmission to the audio input port of the second audio device.

13. Non-transitory physical electronic storage comprising instructions stored thereon that, when executed by one or more hardware processors, cause the one or more hardware processors to communicate audio enhancement settings to an audio device, the instructions comprising:
  specifying an adjustment for a first audio enhancement setting installed in a second device in communication with the first device, wherein the second device is a television and wherein the adjustment for the first audio enhancement setting comprises an adjustment to a filter coefficient;
  encoding the adjustment in an analog audio signal that includes audio data and communicate the analog audio signal through an audio output port of the first device to an audio input port of the second device as an analog modulated signal, thereby enabling the second device to implement the adjustment and play back the audio data;
  wherein said communicating the analog audio signal to the second device comprises communicating the analog audio signal through an audio output port of the first device to an audio input port of the second device;
  wherein said encoding comprises:
    including a trigger signal in the analog audio signal to indicate to the second device that the analog audio signal includes the adjusted value of the selected audio enhancement parameter, the trigger signal comprising a predefined bit pattern configured to cause the second device to decode the analog audio signal and extract the adjusted value of the selected audio enhancement parameter while muting the predefined bit pattern from playback; and
    including additional data in the analog audio signal along with the trigger signal, said additional data configured to prevent the second device from misidentifying a presence of the trigger signal in the audio data;
  receiving, on an audio input port of the first device, a second audio enhancement setting from the second device, the second audio enhancement setting comprising the adjusted value of the selected audio enhancement parameter; and communicating the second audio enhancement setting to the adjustment module to be outputted on a user interface of the first device.

14. The non-transitory physical electronic storage of claim 13, wherein the user interface is configured to provide functionality for the user to input the adjustment.

15. The non-transitory physical electronic storage of claim 14, wherein the adjustment comprises a value of a parameter of the audio enhancement setting.

16. The non-transitory physical electronic storage of claim 14, wherein the adjustment comprises an instruction to disable the audio enhancement setting.

17. The non-transitory physical electronic storage of claim 16,
wherein the instructions further comprise specifying a subsequent adjustment of the audio enhancement setting installed at the second device, and
wherein communicating the subsequent adjustment to the second device causes the second device to disable the audio enhancement setting previously installed in the second device due to the subsequent adjustment being installed at the second device.

18. The non-transitory physical electronic storage of claim 17, wherein the first device is an audiovisual receiver.

19. The non-transitory physical electronic storage of claim 13, wherein the instructions further comprise: receiving the audio data and forming the audio data into packets; applying one or more frames to the packets; applying an error correction coding to the one or more frames and outputs an encoded audio signal; and performing of a modulation of the encoded audio signal to prepare for transmission to the second device.

20. A system for communicating audio-visual settings to an electronic device, the system comprising:
a first electronic device comprising one or more processors configured to:
provide functionality for a user to adjust one or both of audio parameters or video parameters in a second electronic device and to receive a selection from the user of an adjusted value of a selected one of the audio or video parameters, wherein the second electronic device is television and the adjusted value of the audio parameter comprises a filter coefficient;
encode a command for adjusting the adjusted value of the selected audio or video parameter in an analog audio signal that includes audio data and to communicate the analog audio signal through an audio output port of the first electronic device to an audio input port of the second electronic device as an analog modulated signal, thereby enabling the second electronic device to set the selected audio or visual parameter to the adjusted value and play back the audio data,
wherein said encoding comprises including a trigger signal in the analog audio signal to indicate to the second electronic device that the analog audio signal includes the adjusted value of the selected audio or video parameter, the trigger signal comprising a predefined bit pattern configured to cause the second electronic device to decode the analog audio signal and extract the adjusted value of the selected audio or video parameter while muting the predefined bit pattern from playback;
receive, on an audio input port of the first device, an audio-visual setting from the second electronic device, the audio-visual setting comprising the adjusted value of the selected audio or visual parameter; and
communicate the audio-visual setting to the adjustment module to be outputted on a user interface of the first electronic device.

21. The system of claim 20, wherein the trigger signal is configured to enable detection of the command for adjusting the adjusted value in the analog audio signal.

22. The system of claim 20, wherein the trigger signal is configured to enable communications synchronization in the second electronic device.

23. The system of claim 20, wherein a level of the trigger signal is configured to be used to interpret amplitude of the analog audio signal.

24. The system of claim 20, wherein the one or more processors is further configured to: receive the audio data and forming the audio data into a packet wherein the packet has the triggering signal as a preamble; apply one or more frames to the packets; forward an error correction coding to the one or more frames and outputs an encoded audio signal; and perform a modulation of the encoded audio signal to prepare for transmission to the audio input port of the second device.

* * * * *